US010819558B2

United States Patent
Wuhib et al.

(10) Patent No.: US 10,819,558 B2
(45) Date of Patent: Oct. 27, 2020

(54) METHOD AND AGENT FOR SHARING INFORMATION ABOUT CLOUDLET PROPERTIES IN DISTRIBUTED CLOUD ENVIRONMENTS

(71) Applicant: Telefonaktiebolaget LM Ericsson (publ), Stockholm (SE)

(72) Inventors: Fetahi Wuhib, Sundbyberg (SE); Ying Liu, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 709 days.

(21) Appl. No.: 15/324,208

(22) PCT Filed: Apr. 5, 2016

(86) PCT No.: PCT/SE2016/050285
§ 371 (c)(1),
(2) Date: Jan. 5, 2017

(87) PCT Pub. No.: WO2017/176178
PCT Pub. Date: Oct. 12, 2017

(65) Prior Publication Data
US 2018/0183652 A1    Jun. 28, 2018

(51) Int. Cl.
*H04L 12/24* (2006.01)
*H04L 29/08* (2006.01)
(Continued)

(52) U.S. Cl.
CPC .......... *H04L 41/046* (2013.01); *G06F 9/5072* (2013.01); *H04L 67/10* (2013.01); *H04L 67/2842* (2013.01); *H04L 43/106* (2013.01)

(58) Field of Classification Search
CPC ... H04L 41/046; H04L 67/2842; H04L 67/10; H04L 43/106; G06F 9/5072
(Continued)

(56) References Cited

U.S. PATENT DOCUMENTS

| 10,162,678 B1 * | 12/2018 | Stafford | G06F 9/5016 |
| 2005/0117735 A1 * | 6/2005 | Seidman | H04M 3/5232 379/265.02 |
| 2009/0089300 A1 * | 4/2009 | Vicente | H04L 41/0893 |

(Continued)

FOREIGN PATENT DOCUMENTS

| WO | 2007113164 A1 | 11/2007 |
| WO | 2015167372 A1 | 11/2015 |

OTHER PUBLICATIONS

PCT International Search Report, PCT/SE2016/050285, dated Nov. 24, 2016, 4 pages.
(Continued)

*Primary Examiner* — David R Lazaro
*Assistant Examiner* — Berhanu Shitayewoldetadik
(74) *Attorney, Agent, or Firm* — Boisbrun Hofman, PLLC

(57) ABSTRACT

It is disclosed an agent of a first cloudlet and a method performed therein, the first cloudlet having one or more service properties, the first agent having associated a first group of one or more other cloudlets. Based on an exchange of information about service properties of cloudlets accessible to each agent, a comparison is made between service properties from different cloudlets, and if a certain cloudlet has at least one service property that exceeds a service property of any one of the first group of cloudlets, the certain cloudlet is added to a group of cloudlets, which efficiently represents service properties available to the first agent.

20 Claims, 3 Drawing Sheets

(51) Int. Cl.
*G06F 9/50* (2006.01)
*H04L 12/26* (2006.01)

(58) Field of Classification Search
USPC ............................................. 709/202
See application file for complete search history.

(56) References Cited

U.S. PATENT DOCUMENTS

| | | | | |
|---|---|---|---|---|
| 2010/0042720 A1* | 2/2010 | Stienhans | ............. | G06F 9/5072 709/226 |
| 2011/0154350 A1* | 6/2011 | Doyle | ................ | H04L 67/1008 718/104 |
| 2012/0096134 A1* | 4/2012 | Suit | .................... | H04L 12/6418 709/221 |
| 2012/0131193 A1* | 5/2012 | Ferris | .................... | G06F 9/5072 709/226 |
| 2014/0047341 A1* | 2/2014 | Breternitz | ............... | G06F 9/505 715/735 |
| 2014/0052864 A1* | 2/2014 | Van Der Linden | ..... | H04L 47/70 709/226 |
| 2015/0085664 A1* | 3/2015 | Sachdev | ............. | H04L 41/5019 370/236 |
| 2015/0180734 A1* | 6/2015 | Maes | .................... | G06F 9/5072 709/226 |
| 2015/0195372 A1* | 7/2015 | Zheng | .................... | H04L 67/04 709/217 |
| 2016/0050262 A1* | 2/2016 | Kumar | ................ | H04L 43/0876 709/204 |
| 2016/0105359 A1* | 4/2016 | Kim | ........................ | H04L 43/04 370/252 |
| 2016/0191407 A1* | 6/2016 | Dvorkin | ................ | G06F 9/5072 709/226 |
| 2017/0102933 A1* | 4/2017 | Vora | .................... | H04L 43/0817 |

OTHER PUBLICATIONS

Dabek, Frank, et al., "Vivaldi: A Decentralized Network Coordinate System", SIGCOMM'04, Aug. 30-Sep. 3, 2004, Portland, Oregon, Copyright 2004 ACM 1-58113-862-8/4/0008 . . . , 12 pages.
European Patent Office Communication dated Jan. 3, 2020, 7 pages.

* cited by examiner

METHOD AND AGENT FOR SHARING INFORMATION ABOUT CLOUDLET PROPERTIES IN DISTRIBUTED CLOUD ENVIRONMENTS

CROSS-REFERENCE TO RELATED APPLICATION

This application is the National Stage of, and therefore claims the benefit of, International Application No. PCT/SE2016/050285 filed on Apr. 5, 2016, entitled "METHOD AND AGENT FOR SHARING INFORMATION ABOUT CLOUDLET PROPERTIES IN DISTRIBUTED CLOUD ENVIRONMENTS." The above-referenced application is commonly assigned with this National Stage application and is incorporated herein by reference in its entirety.

TECHNICAL FIELD

This disclosure relates to resource property sharing in distributed cloud environments. More particularly, it relates to an agent and a method therein for sharing information about cloudlet resource properties in distributed cloud environments.

BACKGROUND

This invention concerns large cloud environments where a cloud service is provided by a large number of resources. These cloud resources may further be subdivided into smaller groups or cloudlets. A cloudlet is a fully fledged cloud environment that is capable of providing a cloud service.

One example of such a cloud environment is the so-called telco-cloud. Telco-clouds are cloud services that are provided by telecom operators (Telco's). Since Telco's have physical presence in a large, geographically distributed area, they may also deploy a large number of cloudlets distributed along with their infrastructure.

Another example of such cloud environment is a device cloud. Device clouds are cloud services that are provided by small, Internet-connected devices. An example of such a cloud is a storage cloud that is being provided by Internet connected hard-disks. These hard-disks may be connected at home but they form part of a distributed cloud that provides cloud storage service publicly.

A key problem in workload scheduling of large cloud environments, such as the ones mentioned above, is that of finding resources that are suitable for a given workload. In general, each cloud resource or cloudlet has a set of attributes that describe its characteristics. For example, in the device cloud discussed above, service attributes such as available space, available bandwidth to access-point, geographical location, some measure of the quality of the service and cost for storing files on it, may be considered. A user (or an application on behalf of the user) of this cloud service may specify a set of attributes that need to be fulfilled by the provisioned cloud resource. For instance, the user may need to store a 80 Gigabyte (Gb) file on a disk, with an available bandwidth of at least 10 Megabits per second (Mbps) with 99.99% availability.

Scheduling algorithms generally assume that up-to-date information about service attributes of all cloudlets is centrally available. However, for large cloud environments including thousands (or even millions) of devices, maintaining such a database is resource intensive, and querying such a database is often a slow process. Moreover, a central database is typically a single point of failure, and may also be a performance bottleneck.

There is hence a need to address at least some of the issues outlined above.

SUMMARY

It is an object of exemplary embodiments herein to address at least some of the issues outlined above and to provide sharing of information about service properties in a distributed environment.

This object and others are achieved by a cloudlet agent and a method performed therein, according to the appended independent claims, and by the exemplary embodiments according to the dependent claims.

According to an aspect, the exemplary embodiments provide a first agent capable to reside in a first cloudlet within a cloud of distributed cloudlets, where the first cloudlet has one or more service properties. The first agent is adapted to have associated a first group of one or more other cloudlets fulfilling certain criteria on geographical location, processing architecture and/or service properties. The first agent is further adapted to send to a randomly selected agent of a second cloudlet fulfilling said certain criteria and information about service properties of the first group of said one or more other cloudlets. The first agent is also adapted to receive, from said randomly selected agent, information about service properties of a second group of cloudlets fulfilling said certain criteria. Also, the first agent is adapted to compare service properties of the first group of said one or more other cloudlets with service properties of each said cloudlet of said second group of cloudlets fulfilling said certain criteria. In addition, the first agent is, for each said cloudlet of the second group of cloudlets, if at least one service property exceeds a service property of any one of the first group of cloudlets, adapted to add said cloudlet from the second group to said first group of cloudlets.

According to another aspect, the exemplary embodiments provide a method performed in a first agent residing in a first cloudlet within a cloud of distributed cloudlets, where the first cloudlet has one or more service properties. The first agent has associated a first group of one or more other cloudlets fulfilling certain criteria on geographical location, processing architecture and/or service properties. The method comprises sending, to a randomly selected agent of a second cloudlet fulfilling said certain criteria, information about service properties of the first cloudlet and information about service properties of the first group of said one or more other cloudlets. The method also comprises receiving, from said randomly selected agent, information about service properties of a second group of cloudlets fulfilling said certain criteria. The method further comprises comparing service properties of the first group of said one or more other cloudlets with service properties of each cloudlet of said second group of cloudlets fulfilling said certain criteria. In addition, the method comprises for each said cloudlet of the second group of cloudlets, if at least one service property exceeds a service property of any one of the first group of cloudlets, adding said cloudlet from the second group to said first group of cloudlets.

According to further aspects, the object is also achieved by a computer program comprising computer readable code which when run on at least one processing circuit, causes the at least one processing circuit to carry out the method of said another aspect above.

According to yet further aspects, the object is also achieved by a computer program product comprising a computer-readable storage medium and the computer program of said further aspects, wherein the computer program is stored on the computer-readable storage medium.

Exemplary embodiments of this disclosure present the following advantages:

This disclosure is independent of any central database, unlike other art, making this disclosure extremely scalable and robust. It is scalable because it can easily support cloud environments composed of thousands or even millions of cloudlets agents. It is robust since by design, there is no single point of failure. Since this approach does not have an entity that has global knowledge about the cloud environment, it is also particularly suited for environments where devices lie under different administrative domains.

BRIEF DESCRIPTION OF THE DRAWINGS

Embodiments will now be described in more detail, and with reference to the accompanying drawings, in which.

DETAILED DESCRIPTION

In the following description, exemplary embodiments will be described in more detail, with reference to accompanying drawings. For the purpose of explanation and not limitation, specific details are set forth, such as particular examples and techniques in order to provide a thorough understanding.

The following disclosure presents an agent of a cloudlet and a method performed therein, for sharing service properties in a cloud of cloudlets, such that an agent of each cloudlet gains information about suitable endpoints in the cloud where service properties can meet a service request from an end user.

This disclosure presents a fully decentralized approach for sharing service properties in a distributed cloud environment. Information about service properties may further be used in a search for suitable candidates for a decentralized scheduler. However, searching, per se, for suitable candidates falls outside the scope of this application.

Herein, a distributed cloud environment is composed of multiple so called cloudlets. A cloudlet may be a hardware resource, or a set thereof, with an associated agent or software stack that allows it to provide a cloud service. Cloudlets may be large in number and are found distributed in a network.

Figure 1A:
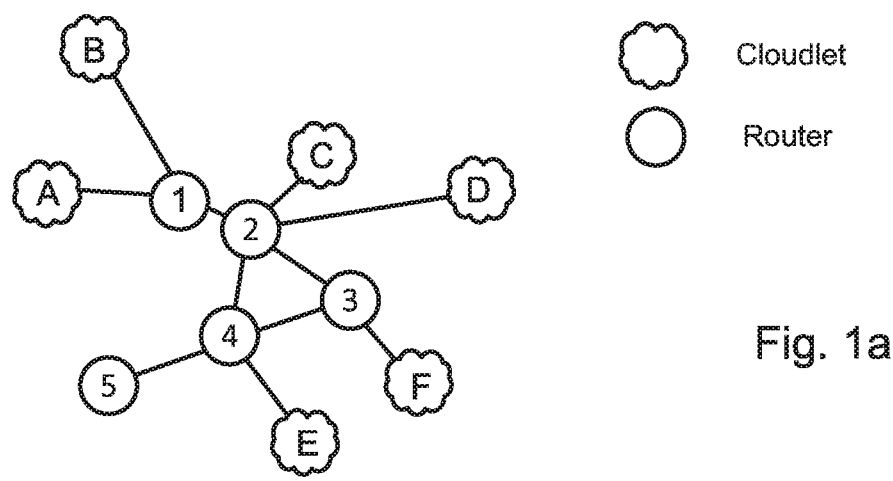
FIG. 1a schematically illustrates a distribution of cloudlets in a cloud.

FIG. 1a schematically presents a distributed cloud of cloudlets. Cloudlets A-F are connected to each other via one or more routers 1-5.

Figure 1B:
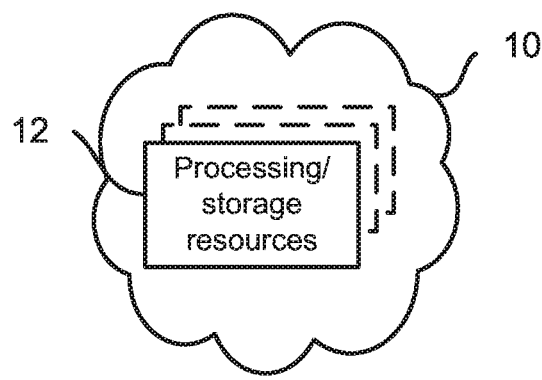
FIG. 1b schematically presents a cloudlet of a cloud.

FIG. 1b schematically presents a cloudlet 10 of said cloudlets of the distributed cloud. This cloudlet 10 comprises one or more processing and storage resources 12, which have processing and storage properties.

As mentioned above a cloud may comprise a large number of cloudlets. If each cloudlet would send updates of its capabilities and load to its neighbours, and each neighbour would forward information of second, third etc. nearest neighbours, on a regular basis, the network connecting the cloudlets would most likely be overloaded. Sending updated information about current load and capabilities of, for instance, a million cloudlets would load the network considerably.

This invention solves this problem of efficiently sharing service property information among nearest neighbours. Based on this information each agent collects information about where service properties, such as resources, are currently available. This information may then advantageously be used in a search for suitable service properties to meet a service request.

Service property as used herein may refer to a summary of service characteristics of a cloudlet.

For a storage device type of cloud, service properties of a cloudlet may include amount of available storage, available bandwidth at a cloudlet access-point, price-per-Gb for storing files, location in the network etc.

This disclosure provides an agent, for instance a logical node, running in, or in association with, each cloudlet in the network. Each agent has access to up-to-date information about both service properties of its cloudlet by using a mechanism that is disclosure. Service properties may be dependent and independent, where the dependent ones depend on its neighbours, whereas the independent ones reflect resources internal to the cloudlet.

The agent may be executed in one of the processing/storage resources 12 in the cloudlet 10 of FIG. 1b.

When it comes specifically to dependent variables, each agent may have information about where in a network the cloudlet is located.

Certain criteria may be used, to focus on a subset of a possibly very large number of cloudlets. Said certain criteria may be criteria on geographical location of the cloudlet, processing architecture in the cloudlet and/or service properties provided by the cloudlet.

One example of certain criteria for cloudlets may to be accessible from a certain cloudlet within a certain delay time, for instance a round-trip time (RTT).

Cloudlets fulfilling this example of a certain criterion would thus be within a radius corresponding to half the RTT time. If, for instance, the RTT equals to 90 ms, the radius defining the space within which cloudlets would have to be located in to fulfil said certain criterion, would thus be 45 ms.

This invention relates to the task of efficiently providing information, by sharing, about service properties of cloudlets in a distributed cloud environment.

Sharing of information may be performed by having nearest neighbour agents send information about service properties available to its cloudlet. Each cloudlet would then accordingly also receive information about service properties of its neighbour cloudlet from its neighbour agent. Each agent may maintain a group or list of cloudlets, which at the agent has information about and which cloudlets can provide an attractive service property. Cloudlets having a less attractive service property will have a lower priority to be included in the group or list, as compared to cloudlets having a more attractive service property. For instance, service properties may comprise central processing unit (CPU) capacity, memory cache and disk space, to mention a few examples.

The group or list of cloudlets may be maintained by performing comparisons of information of cloudlets in the group or list with information of cloudlets from neighbouring agents. Based on results of comparisons between service properties of cloudlets the group or list may be managed. The group or list of cloudlets may be updated based on comparisons between cloudlets already in the group or list and information about cloudlets from neighbouring agents.

Figure 2:
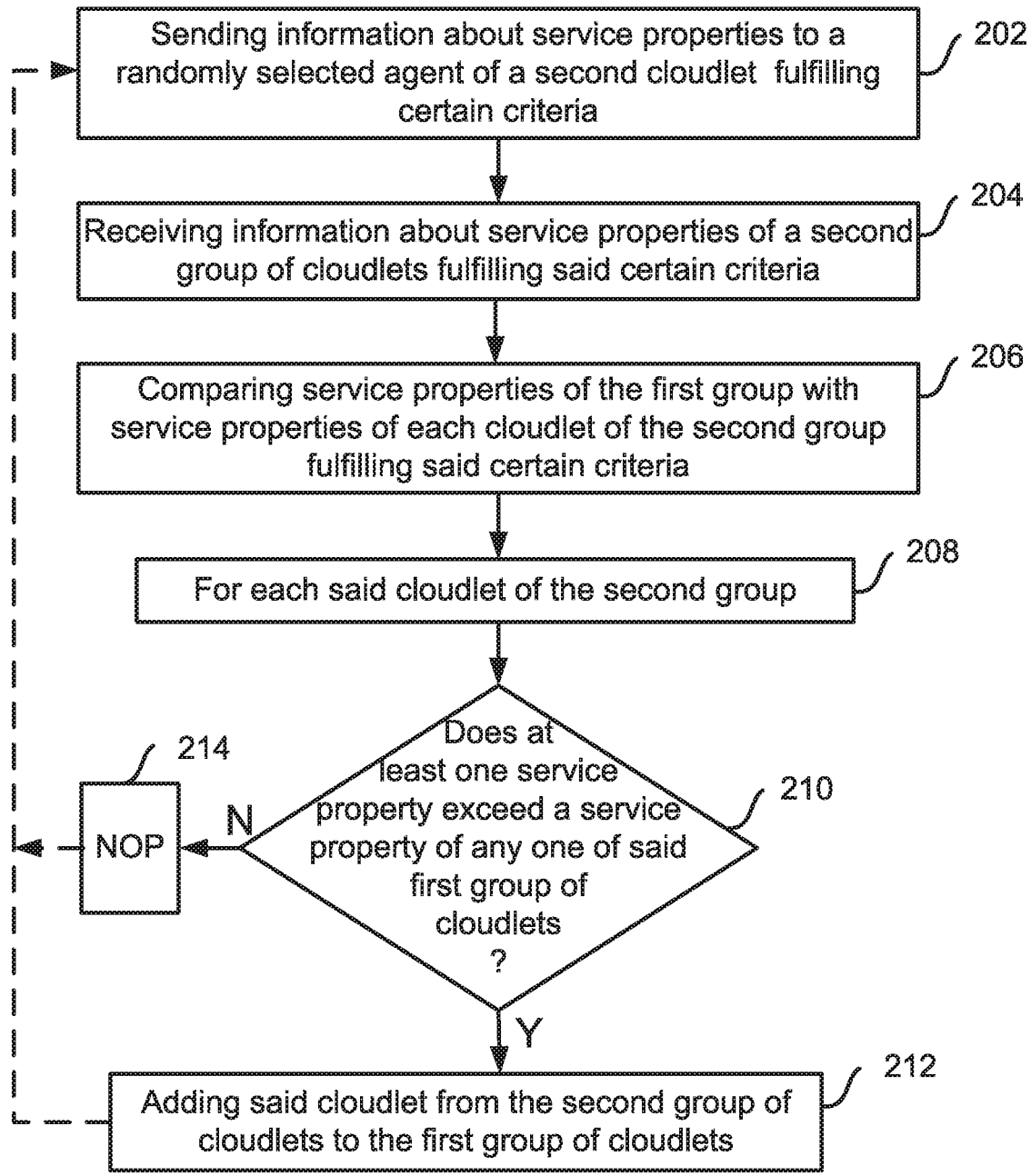
FIG. 2 presents actions in a method being performed in an agent of a cloudlet, according to some embodiments.

FIG. 2 presents a flow chart of action within a method performed in a first agent residing in a first cloudlet within a cloud of distributed cloudlets. The first cloudlet has one or more service properties. The first agent has associated a first group of one or more other cloudlets, which fulfill certain criteria of geographical location, processing architecture and/or service properties.

The method comprises the following actions:

Action 202: Sending, to a randomly selected agent of a second cloudlet that fulfill said certain criteria, information about service properties of the first cloudlet and information about service properties of the first group of said one or more other cloudlets.

Said first group of one or more other cloudlets may have service properties which all exceed service properties of at least one cloudlet fulfilling said certain criteria.

Another procedure that is outside of this disclosure may be responsible for randomly selecting an agent of said second cloudlet.

Action 204: Receiving, from said randomly selected agent, information about service properties of a second group of cloudlets fulfilling said certain criteria.

Action 206: Comparing service properties of the first group of said one or more other cloudlets with service properties of each cloudlet of said second group of cloudlets fulfilling said certain criteria.

Action 208-210: For each said cloudlet of the second group of cloudlets, determine whether at least one service property exceeds a service property of any one of the first group of cloudlets.

Action 212: When the said at least one service property exceeds a service property of any one of the first group of cloudlets, performing action 212: Adding said cloudlet from the second group to said first group of cloudlets.

The criteria fulfilled by said one or more other cloudlets may comprise criteria of geographical location such as being located within a radius of a certain distance or being accessible within an RTT delay time.

The criteria fulfilled by said one or more other cloudlets may comprise criteria of having a certain processing architecture.

The criteria fulfilled by said one or more other cloudlets may comprise criteria of meeting certain service properties. These service properties may, for instance, comprise certain amount of processing/storage resources to be available within a specified RTT delay time.

The method may also comprise performing no operation 214 when the said at least one service property does not exceed a service property of any one of the first group of cloudlets.

Further the method may comprise performing actions 202-212, or 202-214, periodically.

The actions may, for instance, be performed every 10 seconds. Service properties of each cloudlet are dynamic and may change with time due to varying loads.

The method may further comprise limiting the number of cloudlets in the first group to k, by prioritizing cloudlets in the group having service properties which all exceed service properties of a higher number of cloudlets fulfilling said certain criteria, before cloudlets in the group having service properties which all exceed service properties of a lower number of cloudlets fulfilling said certain criteria.

The method may further comprise maintaining the number of k cloudlets in the group by prioritizing cloudlets having service properties which all exceed service properties of as many other cloudlets as possible.

The number of k may for instance be 10 or 20.

The service properties of any cloudlet may comprise one or more of: processing capacity, size of storage memory and size of cache memory.

Fulfilling said certain criteria may comprise being accessible within a predetermined delay time from the first cloudlet.

Fulfilling said certain criteria may comprise having certain virtualization architecture, such as for example running virtual machines from a certain software provider.

Information about service properties of a cloudlet may comprise a time stamp, for which reason the method may also comprise removing a certain cloudlet from the first group of cloudlets when information about service properties of said certain cloudlet reaches a predetermined age threshold.

Hence, if a candidate cloudlet has a specific service property that exceeds the service property of all cloudlets already in the group or list, this candidate cloudlet may be added to the group or list.

Also, if a candidate cloudlet has service properties which all exceed service properties of at least one cloudlet in the group or list, the candidate cloudlet may be added to the group or list.

In order to minimize the amount of information about cloudlet which is communicated, a concept of "covering" may be used. Covering is potentially applicable to any two or more cloudlets. A cloudlet A covers another cloudlet B when all service properties of A exceed corresponding service properties of cloudlet B.

Therefore, a cloudlet can represent and provide a service of the service properties of all other cloudlets that it covers.

In other words, a covering cloudlet is superior to the cloudlets which are covered, with regard to the service properties, whereas the cloudlets that are covered are inferior to the covering cloudlet. Hence, cloudlets that are covered by a covering cloudlet do not provide any better or higher service properties that the covering cloudlet.

It is emphasized that service properties of a cloudlet are dynamic and typically change over time. Which one is covering and which one is covered may thus change dynamically.

We also note that for any two cloudlets, if the service properties of one cloud do not cover the service properties of the other cloudlet, both cloudlets may have to be considered further when managing or keeping track of valuable service properties of cloudlets in a cloud.

It is noted that the method as presented above implements a completely decentralized approach to identify and keep track of service properties of cloudlets fulfilling certain criteria.

It is here assumed that there is a procedure that randomly samples cloudlet agents fulfilling certain criteria, for instance, a given round-trip delay time. This procedure is outside of this disclosure.

The method of FIG. 2 may be executed indefinitely. The period with which to periodically perform the method may be configured by an operator of the cloud.

Essentially, this method comprises taking in a set of cloud identifiers, such as service properties, and comparing them property by property. If all of a cloudlet's property is worse or equal to another cloudlet's property, it means that the former cloudlet is covered by the latter cloudlet and shall hence be removed from a group or list of cloudlets, if already present, or fails to qualify as a candidate to be added to such a group or list.

The method as described in this disclosure may run in a number of cloudlets of a cloud, where the cloudlets fulfill said certain criteria. This method may be considered to be a master method for the reason that it first sends information before receiving service property information from neighbouring agents. As a response to this master method, a slave method similar to the master method as described may run in agents firstly receiving information. Hence this slave method may comprise receiving information about service properties from an agent of a cloudlet, after which the receiving cloudlet may return its own information about service properties and information about random samples from neighbouring cloudlets available to said received cloudlet. Based on received service property information, the agent of said cloudlet updates its own associated group of cloudlets having service properties which can be accessed.

Multiple instances of master and slave methods, each for cloudlets fulfilling certain criteria, may hence be run by agents in the cloud.

The actions of the method may be commented further.

Initially, the first agent may not be associated with any other cloudlet, which fulfills certain criteria on geographical location, processing architecture and/or service properties. In this case, in action 202, the agent sends information about service properties of its own cloudlet only, since the agent may not have information about any other cloudlets at this stage. In action 204, the first agent receives, from the randomly selected agent, information about service properties of a group of cloudlets fulfilling said certain criteria. In this case in action 206, the first agent compares service properties of the first cloudlet with service properties of each cloudlet of said group of cloudlets fulfilling said certain criteria.

Also, in this case, action 208-210 may comprise for each said cloudlet of the group of cloudlets, determine whether at least one service property exceeds a service property of the first cloudlet. Also, in action 212, when the said at least one service property exceeds a service property of the first cloudlet, adding said cloudlet from the second group to the first cloudlet forming a first group of cloudlets.

The present disclosure also comprises a computer program, comprising computer readable code which when run on at least one processing circuit, causes the at least one processing circuit to carry out the master method as above, for sharing information of service properties among cloudlet agents.

The present disclosure also comprises a computer program product comprising computer-readable storage medium having stored thereon a computer program, as above.

According to an aspect, the exemplary embodiments provide a first agent capable to reside in a first cloudlet within a cloud of distributed cloudlets, where the first cloudlet has one or more service properties. The first agent is adapted to have associated a first group of one or more other cloudlets fulfilling certain criteria on geographical location, processing architecture and/or service properties. The first agent is further adapted to send to a randomly selected agent of a second cloudlet fulfilling said certain criteria and information about service properties of the first group of said one or more other cloudlets. The first agent is also adapted to receive, from said randomly selected agent, information about service properties of a second group of cloudlets fulfilling said certain criteria. Also, the first agent is adapted to compare service properties of the first group of said one or more other cloudlets with service properties of each said cloudlet of said second group of cloudlets fulfilling said certain criteria. In addition, the first agent is, for each said cloudlet of the second group of cloudlets, if at least one service property exceeds a service property of any one of the first group of cloudlets, adapted to add said cloudlet from the second group to said first group of cloudlets.

The first agent may further be adapted to periodically send, receive, compare and add, as above.

The first group of one or more other cloudlets of the first agent has service properties which all may exceed service properties of at least one cloudlet fulfilling said certain criteria.

The first agent may further be adapted to limit the number of cloudlets in the first group to k, by prioritizing cloudlets in the group having service properties which all exceed service properties of a higher number of cloudlets fulfilling said certain criteria, before cloudlets in the group having service properties which all exceed service properties of a lower number of cloudlets fulfilling said certain criteria.

The first agent may further be adapted to maintain the number of k cloudlets in the group by prioritizing cloudlets having service properties which all exceed service properties of as many other cloudlets as possible.

Also, the number of k may for instance be 10 or 20.

The service properties of any cloudlet may comprise one or more of: processing capacity, size of storage memory and size of cache memory.

Fulfilling said certain criteria within the first agent, may comprise being accessible within a predetermined delay time from the first cloudlet.

Fulfilling said certain criteria within the first agent may comprise having certain virtualization architecture.

Information about service properties of a cloudlet may have a time stamp, where the first agent may further be adapted to remove a certain cloudlet from the first group of cloudlets when information about service properties of said certain cloudlet reaches a predetermined age threshold.

Figure 3:
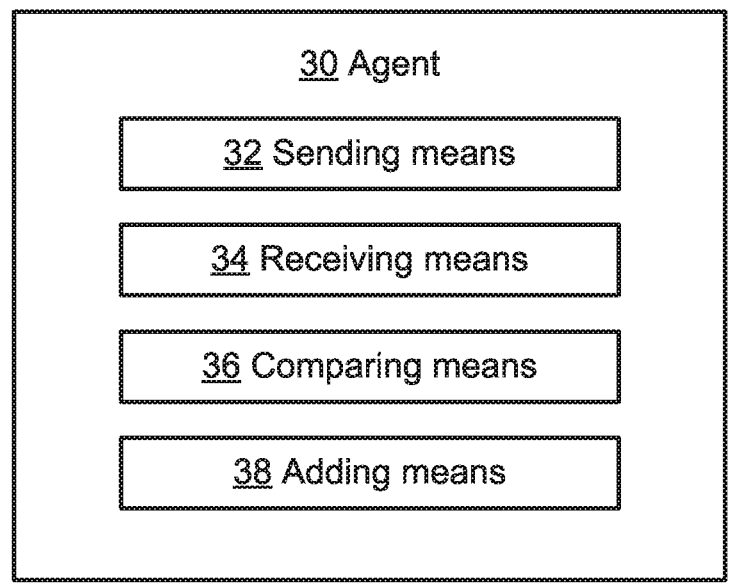
FIG. 3 schematically presents an agent of a cloudlet according to some embodiments.

FIG. 3 schematically presents a first agent 30 of a cloudlet according to some embodiments. This first agent is capable to reside in a first cloudlet within a cloud of distributed cloudlets, where the first cloudlet has one or more service properties. The first agent is adapted to have associated a first group of one or more other cloudlets fulfilling certain criteria on geographical location, processing architecture and/or service properties. The first agent comprises sending means 32, receiving means 34, comparing means 36 and adding means 38. The sending means 32 is further adapted to send to a randomly selected agent of a second cloudlet fulfilling said certain criteria and information about service properties of the first group of said one or more other cloudlets. The receiving means 34 is adapted to receive, from said randomly selected agent, information about service properties of a second group of cloudlets fulfilling said certain criteria. The comparing means 36 is adapted to compare service properties of the first group of said one or more other cloudlets with service properties of each said cloudlet of said second group of cloudlets fulfilling said certain criteria. The adding means 38 is, for each said cloudlet of the second group of cloudlets, if at least one service property exceeds a service property of any one of the first group of cloudlets, adapted to add said cloudlet from the second group to said first group of cloudlets.

Figure 4:
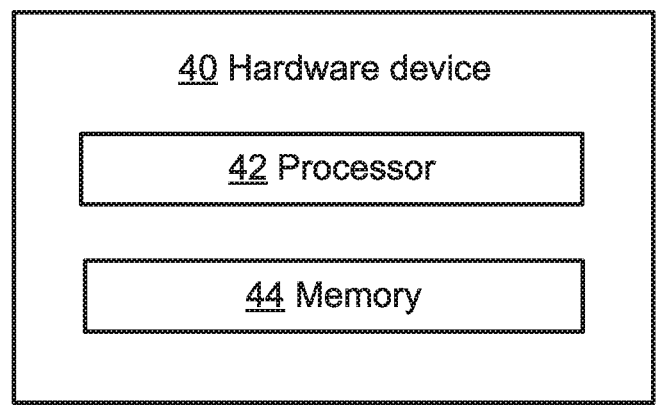
FIG. 4 schematically illustrates a hardware device of processing/storage resources in a cloudlet according to some embodiment.

FIG. 4 schematically illustrates a hardware device 40 of processing/storage resources in a first cloudlet according to some embodiments. This first cloudlet may be located within a cloud of distributed cloudlets, where the first cloudlet has one or more service properties, and where an agent is adapted to have associated a first group of one or more other cloudlets fulfilling certain criteria on geographical location, processing architecture and/or service properties. The hardware device comprises a processor 42 and a memory 44, where said memory 44 contains instructions executable by said processor whereby said hardware device is operative to execute actions of the agent as presented in FIG. 3. The hardware device 40 is thus operative to send, to a randomly selected agent of a second cloudlet fulfilling said certain criteria, information about service properties of the first cloudlet and information about service properties of the first group of said one or more other cloudlets. The hardware device 40 is further operative to receive, from said randomly selected agent, information about service properties of a second group of cloudlets fulfilling said certain criteria. The hardware device 40 is also operative to compare service properties of the first group of said one or more other cloudlets with service properties of each cloudlet of said second group of cloudlets fulfilling said certain criteria. In addition, the hardware device 40 is operative to, for each said cloudlet of the second group of cloudlets, if at least one service property exceeds a service property of any one of the first group of cloudlets, add said cloudlet from the second group to said first group of cloudlets.

Actions of the first agent 40 described herein may hence be executed in a hardware device. The hardware device may, in some cases, include multiple processing circuits or computing devices (e.g., physical servers, workstations, storage arrays, etc.) that communicate and interoperate over a network to perform functions of the described method. Each such computing device may include a processor, or multiple processors, that executes program instructions or modules stored in a memory or other non-transitory computer-readable storage medium or device. The method disclosed herein may be embodied in such program instructions, although some or all of the disclosed functions may alternatively be implemented in application-specific integrated circuits (ASICs) or field-programmable gate arrays (FPGAs) of the hardware device. The result of the disclosed method may be persistently stored by transforming physical storage devices, such as solid state memory chips and/or magnetic disks, into a different state.

Embodiments of the present exemplary embodiments have the following advantages:

Unlike existing approaches, the disclosure is independent of any central database, making this disclosure extremely scalable and robust. It is scalable because it can easily support cloud environments composed of thousands or even millions of cloudlets agents. It is robust since by design, there is no single point of failure. Since this approach does not have an entity that has global knowledge about the cloud environment, it is also particularly suited for environments where devices lie under different administrative domains.

It may be further noted that the above described embodiments are only given as examples and should not be limiting to the present exemplary embodiments, since other solutions, uses, objectives, and functions are apparent within the scope of the embodiments as claimed in the accompanying patent claims.

ABBREVIATIONS

ASIC application-specific integrated circuit
CPU central processing unit
FPGA field-programmable gate array
Gb Gigabyte
Mbps Megabits per second
RTT round-trip time
Telco telecom operator

The invention claimed is:

1. A first agent residing in a first cloudlet within a cloud of distributed cloudlets, wherein each of said cloudlets comprises computer processing and storage resources, said first cloudlet having one or more service properties, said first agent being adapted to:
   associate a first group of one or more other cloudlets fulfilling certain criteria on geographical location, processing architecture and/or service properties;
   send, to a randomly selected agent of a second cloudlet fulfilling said certain criteria, information about service properties of said first cloudlet and information about service properties of said first group of said one or more other cloudlets;
   receive, from said randomly selected agent, information about service properties of a second group of cloudlets fulfilling said certain criteria;
   compare service properties of said first group of said one or more other cloudlets with service properties of each cloudlet of said second group of cloudlets fulfilling said certain criteria; and
   for each said cloudlet of said second group of cloudlets, if at least one service property exceeds a service property of any one of said first group of cloudlets, add said cloudlet from said second group to said first group of cloudlets.

2. The first agent according to claim 1, wherein said send, receive, compare and add functions are performed periodically.

3. The first agent according to claim 1, wherein said first group of one or more other cloudlets have service properties which all exceed service properties of at least one cloudlet fulfilling said certain criteria.

4. The first agent according to claim 3, further being adapted to limit a number of cloudlets in said first group to k, by prioritizing cloudlets in said group having service properties which all exceed service properties of a higher number of cloudlets fulfilling said certain criteria, before cloudlets in said group having service properties which all exceed service properties of a lower number of cloudlets fulfilling said certain criteria.

5. The first agent according to claim 1, wherein said service properties of any cloudlet comprise one or more of: processing capacity, size of storage memory and size of cache memory.

6. The first agent according to claim 1, wherein fulfilling said certain criteria comprises being accessible within a predetermined delay time from said first cloudlet.

7. The first agent according to claim 1, wherein fulfilling said certain criteria comprises having certain virtualization architecture.

8. The first agent according to any claim 1, wherein information about service properties of a cloudlet has a time stamp, said first agent further being adapted to remove a certain cloudlet from said first group of cloudlets when information about service properties of said certain cloudlet reaches a predetermined age threshold.

9. A method performed in a first agent residing in a first cloudlet within a cloud of distributed cloudlets, wherein each of said cloudlets comprises computer processing and storage resources, said first cloudlet having one or more service properties, said first agent having associated a first group of one or more other cloudlets fulfilling certain criteria on geographical location, processing architecture and/or service properties, said method comprising:

sending to a randomly selected agent of a second cloudlet fulfilling said certain criteria, information about service properties of said first cloudlet and information about service properties of said first group of said one or more other cloudlets;

receiving, from said randomly selected agent, information about service properties of a second group of cloudlets fulfilling said certain criteria;

comparing service properties of said first group of said one or more other cloudlets with service properties of each cloudlet of said second group of cloudlets fulfilling said certain criteria; and for each said cloudlet of said second group of cloudlets, if at least one service property exceeds a service property of any one of said first group of cloudlets, adding said cloudlet from said second group to said first group of cloudlets.

10. The method according to claim 9, wherein said steps of sending, receiving, comparing and adding are performed periodically.

11. The method according to claim 9, wherein said first group of one or more other cloudlets have service properties which all exceed service properties of at least one cloudlet fulfilling said certain criteria.

12. The method according to claim 11, further comprising limiting a number of cloudlets in said first group to k, by prioritizing cloudlets in said group having service properties which all exceed service properties of a higher number of cloudlets fulfilling said certain criteria, before cloudlets in said group having service properties which all exceed service properties of a lower number of cloudlets fulfilling said certain criteria.

13. The method according to claim 9, wherein said service properties of any cloudlet comprise one or more of processing capacity, size of storage memory and size of cache memory.

14. The method according to claim 9, wherein fulfilling said certain criteria comprises being accessible within a predetermined delay time from said first cloudlet.

15. The method according to claim 9, wherein fulfilling said certain criteria comprises having certain virtualization architecture.

16. The method according to claim 9, wherein information about service properties of a cloudlet has a time stamp, said method further comprising removing a certain cloudlet from said first group of cloudlets when information about service properties of said certain cloudlet reaches a predetermined age threshold.

17. A computer program product comprising a program code stored in a tangible form in a non-transitory computer readable medium, operable to cause a first agent residing in a first cloudlet within a cloud of distributed cloudlets and comprising a processor and a memory to:

send, to a randomly selected agent of a second cloudlet fulfilling certain criteria on geographical location, processing architecture and/or service properties, information about service properties of said first cloudlet and information about service properties of a first group of said one or more other cloudlets;

receive, from said randomly selected agent, information about service properties of a second group of cloudlets fulfilling said certain criteria;

compare service properties of said first group of said one or more other cloudlets with service properties of each cloudlet of said second group of cloudlets fulfilling said certain criteria; and for each said cloudlet of said second group of cloudlets, if at least one service property exceeds a service property of any one of said first group of cloudlets, add said cloudlet from said second group to said first group of cloudlets.

18. The computer program product of claim 17 wherein said program code stored in said computer readable medium is operable to cause said first agent to limit a number of cloudlets in said first group to k, by prioritizing cloudlets in said group having service properties which all exceed service properties of a higher number of cloudlets fulfilling said certain criteria, before cloudlets in said group having service properties which all exceed service properties of a lower number of cloudlets fulfilling said certain criteria.

19. The computer program product of claim 17 wherein fulfilling said certain criteria comprises being accessible within a predetermined delay time from said first cloudlet or having certain virtualization architecture.

20. The computer program product of claim 17 wherein information about service properties of a cloudlet has a time stamp, and said program code stored in said computer readable medium is operable to cause said first agent to remove a certain cloudlet from said first group of cloudlets when information about service properties of said certain cloudlet reaches a predetermined age threshold.

* * * * *